United States Patent [19]

Durham

[11] Patent Number: 5,296,284
[45] Date of Patent: Mar. 22, 1994

[54] DYED HECTORITE PIGMENTS AND APPLICATIONS

[75] Inventor: David H. Durham, Macon, Ga.

[73] Assignee: J. M. Huber Corporation, Rumson, N.J.

[21] Appl. No.: 953,322

[22] Filed: Sep. 29, 1992

Related U.S. Application Data

[63] Continuation of Ser. No. 658,454, Feb. 22, 1991, abandoned, which is a continuation of Ser. No. 183,311, Apr. 5, 1988, abandoned.

[51] Int. Cl.$^5$ .............................................. C09D 11/00
[52] U.S. Cl. ................................. 428/207; 106/22 R; 106/23 R; 106/416; 428/211
[58] Field of Search ..................... 106/22, 23, 416; 428/207, 211

[56] References Cited

U.S. PATENT DOCUMENTS

| | | | |
|---|---|---|---|
| 2,531,427 | 11/1950 | Hauser | 260/448 |
| 2,531,440 | 11/1950 | Jordan | 252/23 |
| 2,966,506 | 12/1960 | Jordan | 260/448 |
| 3,864,294 | 2/1975 | Busch | 106/28 |
| 3,974,125 | 8/1976 | Oswald et al. | 260/40 R |
| 4,081,496 | 3/1978 | Finlayson | 260/864 |
| 4,105,578 | 8/1978 | Finlayson et al. | 252/316 |
| 4,116,866 | 9/1978 | Finlayson | 252/316 |
| 4,193,806 | 3/1980 | Finlayson | 106/20 |
| 4,208,218 | 6/1980 | Finlayson | 106/207.18 |
| 4,216,135 | 8/1980 | Finlayson | 260/40 R |
| 4,287,086 | 9/1981 | Finlayson | 252/316 |
| 4,365,030 | 12/1982 | Oswald et al. | 523/508 |
| 4,382,868 | 5/1983 | House | 252/28 |
| 4,391,637 | 7/1983 | Mardis et al. | 106/20 |
| 4,402,881 | 9/1983 | Alther | 260/448 C |
| 4,410,364 | 10/1983 | Finlayson et al. | 106/20 |
| 4,412,018 | 10/1983 | Finlayson et al. | 523/508 |
| 4,711,727 | 12/1987 | Matthews et al. | 210/727 |

FOREIGN PATENT DOCUMENTS 206800 3/1986 European Pat. Off. .
50-72926 6/1975 Japan .

OTHER PUBLICATIONS

Rowland, B. W., "The Colloidal Nature of Clay with Reference to Papermaking", TAPPI Section, Oct. 17, 1940, pp. 207-212.

Jordan, J. W., "Organophilic Clay-Base Thickeners", Tenth National Conference on Clays and Clay Minerals, pp. 299-308.

"Bentonite, sepiolite, attapulgite, etc.—Swelling markets for active clays", Industrial Minerals, Mar. 1978, pp. 49-90.

McGraw-Hill Encyclopedia of Science & Technology (1966), vol. 2, p. 163; vol. 3, p. 162; vol. 8, pp. 587-588; vol. 10, p. 223; vol. 14, pp. 610-611.

*Primary Examiner*—Jenna L. Davis

[57] ABSTRACT

A coloring pigment useful for coloring or tinting inks, paints, plastics and rubber comprises the reaction product of a cationic organic dye and a hectorite mineral, the hectorite mineral having a small average particle size and a high cation exchange capacity. The pigment has excellent color strength and does not bleed in water or oil and is easily dispersable in aqueous and organic media.

12 Claims, 1 Drawing Sheet

40,000 X

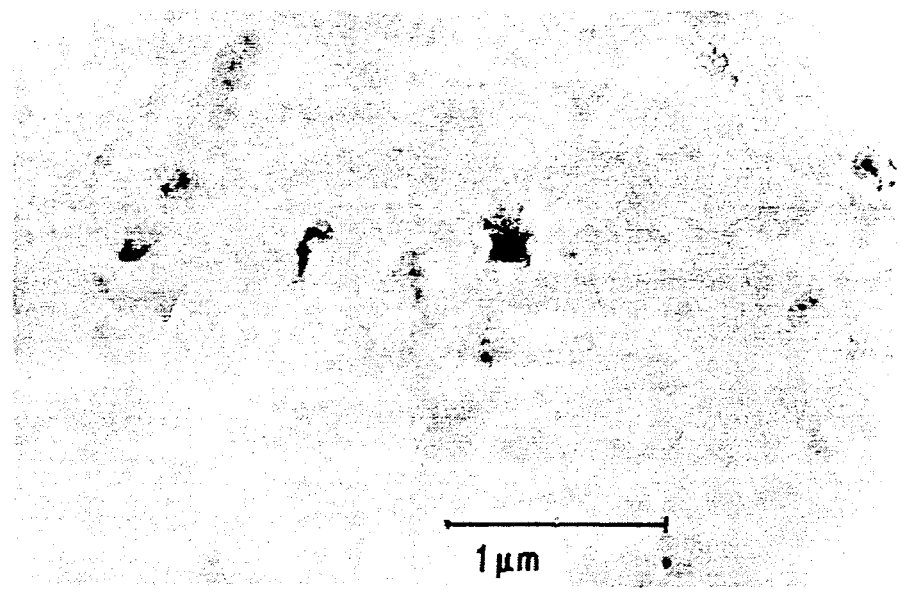
FIG. 1    40,000X
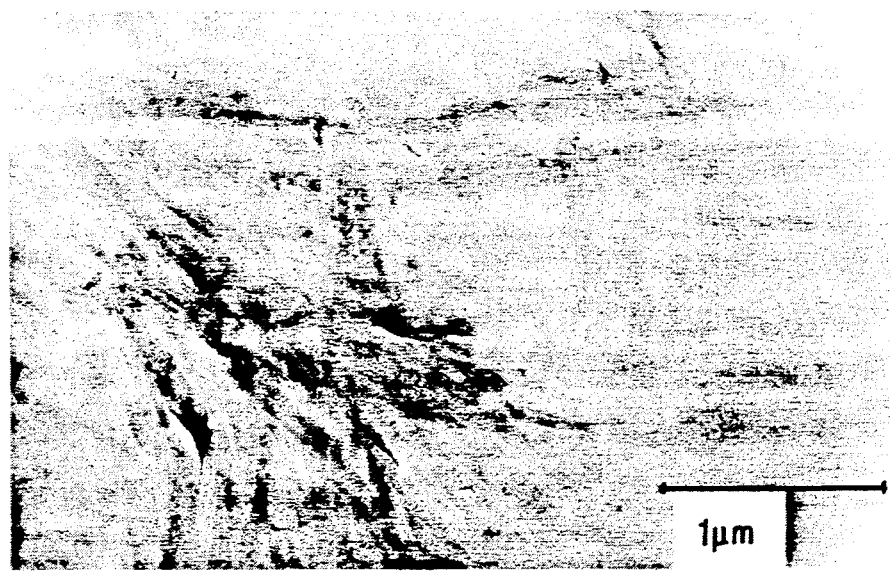
FIG. 2    40,000X

DYED HECTORITE PIGMENTS AND APPLICATIONS

This application is a continuation of application Ser. No. 07/658,454, filed Feb. 22, 1991, which in turn, was a continuation of Ser. No. 07/183,311, filed Apr. 5, 1988 both now abandoned.

TECHNICAL FIELD

This invention relates to pigments useful for coloring or tinting inks, paints, plastics and rubber, and more particularly, relates to such pigments which are produced as reaction products of hectorite minerals and cationic organic dyes.

BACKGROUND ART

Minerals have been used historically in a number of applications such as viscosifiers, anti-settling agents, thixotropes or rheological additives in both aqueous and organic systems. Numerous patents have been issued covering the uses of minerals, including smectite-type minerals, in paints, greases, cosmetics, inks, polyesters and other areas. Also it has been known for many years that layered silicate minerals such as kaolinite, mica, vermiculite, and smectites have a natural exchange capacity for cationic compounds both of the inorganic and organic types. It is this natural exchange capacity characteristic which allows smectitic clays to be converted to useful thixotropes for organic systems. Also it has been known for many years that an organic cationic dye, such as methylene blue, could be used to obtain an approximate measure of the cationic exchange capacity of such minerals. In this procedure the cationic organic dye is exchanged onto the clay surface. It has also been known that organic cationic dyes can be fixed to any layered silicate mineral that possessed an ionic charge.

The pigment to be dyed must accept and hold the dye, not only during the dyeing step but also in subsequent processing steps. Failure to hold the dye results in reduced efficiency of the treatment, and disposal or recirculation of colored filtrates is economically undesirable.

The prior art is aware of products which are coloring agents in printing inks. For example, U.S. Pat. No. 4,410,364, discloses a printing ink formed by dispersing therein an ink coloring material and an organophilic clay gellant. In this patent, the organophilic clay gellant is the reaction product of an organic cation, an organic anion, and a smectite-type clay which has a cationic exchange capacity of at least 75 milliequivalents per 100 grams of the clay so that an organic cation-organic anion complex is intercalated with the smectite-type clay and the cationic exchange sites of the smectite-type clay are substituted with the organic cation.

A series of earlier patents disclose thixotropes or rheological agents by reaction of various clay minerals and cationic agents. However, these products are not coloring agents. Thus, U.S. Pat. No. 4,116,866 discloses the reaction product of a clay with a quaternary ammonium cationic compound. Of the clays disclosed in this patent, there is mentioned bentonite and hectorite, the latter being described as a swelling magnesium-lithium silicate clay. Other types of smectite-type clays disclosed in this patent for reaction include montmorillonite, beidellite, saponite and stevensite. A similar product is disclosed in U.S. Pat. No. 4,287,086.

U.S. Pat. Nos. 4,216,135 and 4,081,496 to Finlayson disclose organophilic clays and thixotropic polyester compositions which contain these clays. This product is the reaction product of a smectite-type clay with a methybenzyl dialkyl ammonium compound, or a dibenzl dialkyl ammonium compound. The products are said to be dispersable in organic liquids to form gels and the gels may be added as gelling agents to polyester compositions.

U.S. Pat. No. 4,105,578 to Finlayson et al discloses organophilic clay gellants prepared as the reaction product of a smectite-type clay and a quaternary ammonium compound. These products are also said to have good dispersability in organic liquids and to form gels and to be useful in lubricating greases, oil paste muds, oil-based packer fluids, paint-varnish-lacquer removers, paints, and foundry molding sand binders and the like.

A series of older U.S. patents including U.S. Pat. Nos. 2,531,440, 2,531,427, and 2,966,506 disclose modified clay complexes which are compatible with organic liquids. These organic clay complexes comprise the reaction product of a clay such as montmorillonite or bentonite and including hectorite with an organic compound of the quaternary ammonium type. The clays used in this series of patents are said to have base exchange capacities which range from about 15 to 100 based on milliequivalents of exchangeable base per 100 grams of clay. These products are disclosed for use as gelling agents.

U.S. Pat. No. 4,382,868 discloses organophilic clays which have enhanced dispersability in organic liquids, the organophilic clays being prepared by extruding a mixture of a smectite clay, a quaternary cationic organic compound, water and an alcohol. U.S. Pat. No. 3,974,125 discloses thixotropic agents comprising clays which have been reacted with dialkyl dimethyl ammonium quaternary salts and incorporation of these products into polyesters. U.S. Pat. No. 3,864,294 discloses coating compositions in the form of a gel which comprise an amine modified montmorillonite clay, a swelling agent therefor, and a non-volatile oleaginous agent for wetting the clay. This product is indicated as adapted for pigment-containing coating systems such as in nail enamel compositions.

Published and unexamined Japanese patent application (Kokai) No. 50-72,926 published Jun. 16, 1975, discloses a method of manufacturing pigments which contain organic coloring agents. These pigments are produced by dispersing a mineral which has clay properties and ionic exchange capabilities in water. To this slurry is added an aqueous solution of an organic coloring element to effect chemical bonding and render the resulting product insoluble in water from which it may be recovered. The clays disclosed for use in this patent include montmorillonite, zeolites and bentonite. The coloring agents are primarily organic dyes.

European Patent Application No. 206,800, published Mar. 30, 1986, discloses water insoluble pigments which comprise a complex of the water insoluble inorganic anionic exchange material which has a layered structure and a water soluble dye. The anionic exchange material with the layered structure may comprise any of a number of known mineral materials including magnesium aluminum chloride and the dyes are organic dyes.

The present invention provides a coloring pigment useful for coloring materials which is an improvement over these prior known products.

DISCLOSURE OF THE INVENTION

It is accordingly one object of the present invention to provide a pigment useful for coloring or tinting inks, paints, plastics and rubber.

A further object of the present invention is to provide a pigment for coloring materials which comprises the reaction product of an organic dye with a hectorite mineral.

A still further object of the present invention is to provide methods for preparation of pigments useful for coloring or tinting various products which comprises reaction of a hectorite mineral having a small particle size and high cation exchange capacity with a cationic organic dye.

An even further object of the present invention is to provide colored or tinted inks, paints, plastics and rubber, wherein the coloring agent is a pigment which is the reaction product of a cationic organic dye with a hectorite mineral, the hectorite mineral being characterized by having a small average particle size, a novel morphology and high cation exchange capacity. The pigment has color strength equal to commercial pigments and does not bleed in water or oil, and is easily dispersable in aqueous and organic media.

Other objects and advantages of the present invention will become apparent as the description thereof proceeds.

According to this invention, there is provided a coloring pigment useful for coloring or tinting inks, paints, plastics and rubber, the pigment comprising the reaction product of a cationic organic dye and a hectorite mineral, the hectorite mineral having a small average particle size and a high cation exchange capacity.

The present invention also provides a method for preparation of pigments useful for coloring or tinting inks, paints, plastics and rubber which comprises reacting a cationic organic dye with a hectorite mineral, the hectorite mineral having a small average particle size, a novel morphology and high cation exchange capacity, the reaction being carried out in dried form or in an aqueous medium, and recovering the reaction product.

Also provided by the present invention are colored or tinted printing inks, paints, plastics, and rubber compositions, said compositions containing a coloring pigment which comprises the reaction product of a cationic organic dye and a hectorite mineral, the hectorite mineral having a small average particle size and high cation exchange capacity.

BRIEF DESCRIPTION OF THE DRAWING

Reference is now made to the drawing accompanying the application wherein:

FIG. 1 is an enlarged photograph (40,000×) of the Nevada hectorite mineral used in the present invention; and FIG. 2 is an enlarged photograph (40,000×) of a California hectorite.

BEST MODE FOR CARRYING OUT THE INVENTION

The present invention relates to a pigment which is useful for coloring or tinting various materials including inks, paints, plastics and rubber. This pigment is the reaction product of a cationic organic dye and a hectorite mineral which is characterized by unique physical and chemical characteristics. The pigment produced in accordance with the present invention provides a lower-priced pigment which has the same color strength as commercially used organic and inorganic pigments. Thus the pigment has a color strength equal to commercially-used organic and inorganic pigments when used in color loading amounts of only about 40 to 100% of the amounts required of commercial organic or inorganic pigments. It has unexpectantly been found that these unique pigments do not bleed in water or oil when treated with the proper level of cationic dye and when ground properly, yield pigments which disperse easily into both water and organic media.

The pigments of the present invention can be used in any application where coloring or tinting of a finished material is desired. Inks, paints, plastics and rubber are major systems in which the new dye/mineral pigments can be used.

The dye pigments can be prepared by any number of reaction routes and in fact all methods of preparing organically reacted materials—rheological, thixotropes, viscosifiers or anti-settling agents, can be used successfully. Depending on the end use of the new dye/mineral pigment, certain of the steps may or may not be used. Thus the new pigments can be prepared by an essentially dry process or a wet slurry process. Any process by which the organic dye can be exchanged for the naturally occurring counter ion on the mineral can be used in the manufacture of the pigments. If a high quality dye pigment is desired, additional steps such as sodium exchange of the clay, heating, shearing of the mineral slurry, shearing of the dye mineral product, or special drying and grinding conditions can be used. Many of these steps are conventionally used in the manufacture of organo clays for rheological, thixotropic, viscosifiers and anti-settling agents.

It should be understood, however, that a number of distinctions exist between the organo clay materials of the art as disclosed above and the pigments of the present invention. First, organo clays of the art cannot be used for adding color to a material which requires pigmenting. In fact the base material selected for organo clays is often selected so as to have a high enough brightness that it does not interfere with the development of color in the system in which the organo clays are used. The dye/mineral pigments of the present invention are selected so that they provide color to the system in which they are used. Secondly, organo clays conventionally add viscosity to the system whereas the dye/mineral pigments of this invention can be selected so that the dye/mineral pigments yield as small a viscosity increase as possible in the system in which they are used. Thirdly, the starting material used in organo clays is normally selected so that it has the best swelling when converted to the organo clay. In the dye/mineral pigment of this invention, however, the mineral can be selected so as to provide any desired increase in viscosity or swelling or even none at all.

An important aspect of the present invention resides in the mineral used to prepare the pigment. Hectorites in general are known as magnesium/lithium/silicate clays. The hectorite used in the formation of the products of the present invention, however, is a small particle size hectorite which has a very high cation exchange capacity and which has a unique charge density distribution. The charge density distribution can be seen or detected by differences in the x-ray diffraction spacing. Spacings obtained with this measurement are related to the size of the molecule used and charge density distribution. The hectorite used in this invention provides much higher spacings than other clays of this class when treated in the same manner.

The hectorite used in this invention is a McDermitt, Nevada hectorite and is of the type which is preferably mined in the state of Nevada and which is characterized by a morphology which is distinct from that of other known hectorites. The hectorite has a very fine particle size and will average about 0.1 to 0.6 in average particle size and preferably is about 0.4 microns in average particle size. This hectorite is a calcium-magnesium hectorite which means that it contains larger amounts of calcium than conventional hectorites. The hectorite therefore does not swell as much in aqueous systems as sodium hectorites. Because of the large amount of calcium and magnesium contained in the hectorite, it is preferred according to this invention to conduct a conventional exchange reaction with sodium carbonate and/or a sodium exchange resin to convert the calcium form to the sodium form. The resulting product has a very high cation exchange capacity in the range of 110 to 150 milliequivalents per 100 grams of the dry clay. The cation exchange capacity in milliequivalents per 100 grams of dry clay is calculated on the Ammonium Acetate-Kjeldahl Cation Exchange Capacity test. This is to be contrasted for example with bentonite which has an exchange capacity of about 80 to 90 milliequivalents per 100 grams of dry clay.

The hectorite used in the invention to prepare the coloring agents is found only in Nevada and according to this invention is described as being McDermitt, Nevada hectorite. The hectorite is mined as a crude product at the site in Nevada and is processed to obtain the products suitable for use in this invention by conventional clay processing procedures. Thus, the crude hectorite mineral is dried and crushed or ground to reduce the particle size. Thereafter, the crude mineral is then mixed with water and soda ash or other form of sodium carbonate and extruded through extruders which apply shear to the material. It is preferred to extrude about 1-3 times to obtain good mixing and also at this stage to obtain an exchange reaction with the sodium carbonate to convert at least a portion of the calcium form to the sodium form. At this stage an optional step is then to try and again grind the resulting product.

The hectorite is then made down with water usually under steam and then screened to remove the coarse particles. The resulting product is then centrifuged to separate out fines so as to recover a clean clay fraction which contains no more than about 1-2% of contaminants.

This hectorite has a morphology different from other hectorites of the art in that the particles are generally square or plate-like in shape and are of fine particle size averaging between about 0.1 and 0.6 microns. This is to be contrasted with other hectorites which are generally narrow lath-type hectorites.

Reference may now be made to the drawings accompanying this invention which contrast a Nevada hectorite according to the present invention in FIG. 1 and a California hectorite of the prior art type in FIG. 2. From FIG. 1 it will be noted that there is shown a McDermitt, Nevada hectorite in water on a mica substrate. FIG. 2 is a California hectorite in water on a mica substrate. Both figures are at 40,000× magnification. It will be seen from a comparison of FIGS. 1 and 2 that the hectorite mineral of FIG. 1 is generally square or plate-like in shape, whereas the hectorites of FIG. 2 are long, narrow products which have a lath-like character.

The hectorite of the invention has a charge density which causes a greater than 28.5 angstroms D(001) spacing. The charge density is measured by X-ray diffraction based on the D(001) spacing on the mineral using a dimethyl dihydrogenated tallow ammonium chloride treatment equal to the cation exchange capacity of the material. This determination is made by running an X-ray diffraction pattern. In general as the cation exchange capacity increases, the charge density will also increase. In the present case, the charge density of the hectorite of the invention is so high that the molecule will actually become vertical or stand erect during the determination. Accordingly, the hectorite used in the present invention has a number of characteristics which distinguish it from other hectorites and other minerals of the smectite class. It is these unusual advantages including the high cation exchange capacity which contribute to the substantial advantages achieved when forming the coloring agent of the present invention.

This hectorite is reacted with a dye and preferably a cationic organic dye to form the products of the present invention. The dyes can be any conventional dye which will react with the hectorite base mineral but preferably is a cationic dye. These cationic dyes are well known and include such materials as methyl violet, methylene blue, victoria blue, rhodamine red, Auramine yellow and the specific dyes listed below.

Victoria Blue B
Methylene Blue
Methyl violet X
Rhodamine 6G Red
Auramine Yellow

In a preferred preparation procedure, a hectorite aqueous slurry is formed which may contain from about 1 to 10% solids of hectorite by weight. The hectorite slurry is then heated to about 50° to 100° C. with good mixing and the dye is then dissolved in water and the dye solution is then added and then allowed to react with the hectorite for about 10 minutes to 1 hour with good mixing. To complete the reaction, the dye/hectorite pigment is preferably sheared under high agitation conditions for a short time to achieve the final mixing. The sheared material may then be filtered and washed to remove excess salt. The filter cake is then dried and preferably ground to a very fine particle size.

An important aspect of the present invention is to determine the amount of dye which is to be reacted with the hectorite to form the coloring pigment of the invention. A preferred procedure to follow in determining the amount of dye is to use a procedure of the American Petroleum Institute to determine the maximum dye which can be attached to the pigment. To achieve maximum dye input, it is preferred to determine the maximum dye loading of any dye by using the American Petroleum Institute procedure based on cation exchange capacity as set forth in API RP13b. This procedure may be found in "Recommended Practice-Standard Procedure for Testing Drilling Fluids", 8th Edition (May, 1981), page 23, Sections 9.60 and 9.61.

If is preferred not to apply the maximum amount of dye to the mineral, the following formula may be used.

$$\frac{(A)(B)(C)}{(D)(E)} = (F)$$

Where

A = weight of the hectorite to be treated (dry weight);
B = the number of milliequivalents of dye to be added;
C = the equivalent weight of the dyes;
D = dye activity in percent;
E = 1000 (conversion figure to go from equivalents to milliequivalents);
F = the weight of the dye needed for reaction.

In conducting this reaction, the water used can be tap water or deionized water. It is not necessary to heat the reaction slurry but the better results are provided with heat. Shearing improves the clay dispersion and treatment effectiveness but is not critical to produce the product. Drying can be carried out under controlled low-temperature conditions to prevent the material from drying to excessive hardness. Milling is preferably carried out to obtain the desired fineness for each application.

When incorporated into ink, the preferred loading amounts will range up to about 12 weight percent which corresponds to about 7 weight percent hectorite in the final pigment. Loading amounts in plastics range from about 0.50 to 0.75 weight percent.

The following examples are presented to illustrate the invention but it not to be considered as limited thereto. In the examples and throughout the specification parts are by weight unless otherwise indicated.

EXAMPLE I

A hectorite clay slurry was prepared by adding 15 grams of dry hectorite to water. The slurry was then heated with agitation at 80° C. for 30 minutes. Then 5.05 grams of cationic methylene blue dye was formed as an aqueous solution and added to the hectorite clay slurry. The mixture was then heated for an additional period at 80° C. then cooled and filtered. The dye-treated hectorite was then recovered.

EXAMPLE II

Ingredients 80 meg Methyl violet (cationic dye) × Concentrate Dye = 142.92 g;

48.40 pounds of 2.0662% solids Hectorite Slurry = 454.0 g clay.

The hectorite slurry was heated to 60° to 80° C. while being mixed on a Lightnin Mixer.

The dye was dissolved in water at 5% solids. The dye solution was then added to the hectorite slurry and allowed to react for 30 minutes with mixing and heating at 60°–80°C.

The dyed hectorite pigment was then sheared for one minute in a large Waring blender.

The sheared material was poured on filters and vacuum filtered and wash water was applied to remove excess salt. The filter cake was dried at 80° C. in an oven and ground through a 0.062 inch round hole screen and four passes through a 0.020 inch round hole screen on a Mikro Sampl Mill. Another sample was prepared as above and milled only one pass each through a 0.062 and 0.020 round hole screens on a Mikro Sampl Mill. This second sample was jet milled at Alpine American Corporation in a 100 AFG Mill. Both of these materials were compounded in polypropylene plastic and injection molded. Test results showed properties of the non-jet milled sample were fairly comparable to the unfilled polypropylene except in Gardner drop weight impact while results from the jet milled sample increased the Gardner drop weight impact back towards the unfilled polypropylene values.

Jet milling the methyl violet sample improved coloring capacity as the non-jet milled sample was translucent while the jet milled sample was opaque.

EXAMPLE III

In this example compounding and physical testing of the dye-hectorite pigment of this invention was carried out in order to evaluate the pigment at different loadings when added to plastic. In these evaluations, the dye-hectorite pigment was added in two different loading amounts to the polyolefin which is sold commercially as Himont PP6601. The dye-hectorite pigment of this invention, prepared as in Example II, was added as a filler in loading amounts of 0.5 wt % and 0.75 wt %. Thereafter the filled polyolefin was evaluated with respect to tensile modulus, tensile yield, elongation at the peak, tensile at the break, flexible modulus and flexible strength as shown in Table I. In Table II evaluations are shown with respect to IZOD impact, Gardner DWI, heat distortion, density, and melt flow. In Table III, the filled polyolefin is evaluated with respect to color based on Hunter color values.

In an evaluation of the data from Tables I, II, and III, it will be noted that the data indicates that addition of the dye-hectorite pigment does not increase the physical properties of the compound over the stabilized base resin. Also it will be noted that some decreases in properties appear to occur which must be taken into consideration when selecting the appropriate industrial use for the compound such as elongation, notched IZOD, and Gardner ratings. It is also noted during these evaluations that very few agglomerates are seen in jet milled samples such as the jet milled sample 11 which increased physical properties as compared to sample 6 which was not jet milled. Also very few agglomerates were seen in jet milled samples 11 and 12 but there were many agglomerates seen in non-jet milled samples 5 and 6. The color intensity of the pigment or dye appear to be greatly magnified by jet milling which would appear to extend the color systems. Tables I, II and III are as follows.

TABLE I

| | | EVALUATION OF DYE-HECTORITE PIGMENT AT 0.5% AND 0.75% LOADINGS IN HIMONT PP 6601 | | | | | | |
|---|---|---|---|---|---|---|---|---|
| SAMPLE | FILLER | TENSILE MODULUS PSI | TENSILE YIELD PSI | ELONGA. @ PEAK % | TENSILE @ BREAK PSI | ELONGA. @ BREAK % | FLEX. MOD. PSI | FLEX. STRENGTH PSI |
| 1 | 0.5% | 227300 | 5221 | 7.7 | 2869 | 25.7 | 260500 | 7415 |
| 2 | 0.75% | 230200 | 5229 | 7.9 | 2993 | 17.1 | 264400 | 7468 |
| 3 | 0.5% | 224200 | 5194 | 8.0 | 2485 | 35.0 | 252900 | 7129 |
| 4 | 0.75% | 226500 | 5181 | 8.0 | 2608 | 23.9 | 257400 | 7279 |
| 5 | 0.5% | 221100 | 5141 | 8.0 | 2732 | 34.5 | 257000 | 7271 |
| 6 | 0.75% | 222900 | 5161 | 8.2 | 2842 | 24.7 | 261700 | 7393 |
| 7 | 0.5% | 229000 | 5310 | 7.6 | 3104 | 18.3 | 266500 | 7572 |

TABLE I-continued
EVALUATION OF DYE-HECTORITE PIGMENT AT 0.5% AND 0.75% LOADINGS IN HIMONT PP 6601

| SAMPLE | FILLER | TENSILE MODULUS PSI | TENSILE YIELD PSI | ELONGA. @ PEAK % | TENSILE @ BREAK PSI | ELONGA. @ BREAK % | FLEX. MOD. PSI | FLEX. STRENGTH PSI |
| --- | --- | --- | --- | --- | --- | --- | --- | --- |
| 8 | 0.75% | 222100 | 5213 | 8.2 | 2909 | 43.0 | 254000 | 7207 |
| 9 | 0.5% | 218300 | 5179 | 8.2 | 2851 | 46.1 | 256800 | 7315 |
| 10 | 0.75% | 220300 | 5179 | 8.2 | 2934 | 37.1 | 260600 | 7323 |
| 11 | 0.5% | 226500 | 5306 | 7.9 | 1592 | 36.7 | 262000 | 7448 |
| 12 | 0.75% | 227200 | 5312 | 7.9 | 1742 | 33.2 | 272400 | 7665 |
| 13 Himont 6601 PP | Control | 190500 | 4837 | 9.1 | 2976 | >388.3 | 210400 | 6072 |

TABLE II
EVALUATION OF DYE-HECTORITE PIGMENT AT 0.5% AND 0.75% LOADING IN HIMONT PP 6601

| SAMPLE | FILLER | IZOD IMPACT FT-LBS/IN | GARDNER DWI IN/LBS | HEAT DISTORT. @ 66 PSI DEGREES C. | DENSITY GRAMS/CC | MELT FLOW (COND. L) |
| --- | --- | --- | --- | --- | --- | --- |
| 1 | 0.5% | 0.89 | 3.0 | 92.2 | 0.9072 | 1.73 |
| 2 | 0.75% | 0.80 | 2.9 | 92.1 | 0.9080 | 2.02 |
| 3 | 0.5% | 0.63 | 3.5 | 85.6 | 0.9061 | 1.95 |
| 4 | 0.75% | 0.92 | 2.8 | 81.7 | 0.9078 | 2.01 |
| 5 | 0.5% | 0.81 | 3.8 | 96.4 | 0.9068 | 1.87 |
| 6 | 0.75% | 0.85 | 3.6 | 87.6 | 0.9078 | 1.38 |
| 7 | 0.5% | 0.92 | 3.1 | 94.9 | 0.9079 | 1.66 |
| 8 | 0.75% | 0.81 | 3.0 | 90.5 | 0.9086 | 1.84 |
| 9 | 0.5% | 0.91 | 3.3 | 94.1 | 0.9091 | 2.55 |
| 10 | 0.75% | 0.88 | 3.1 | 84.4 | 0.9093 | 1.74 |
| 11 | 0.5% | 0.99 | 5.9 | 92.4 | 0.9078 | 1.44 |
| 12 | 0.75% | 0.75 | 4.8 | 96.8 | 0.9094 | 1.25 |
| 13 Himont 6601 PP | Control | 0.87 | 7.7 | 80.1 | 0.9040 | 3.34 |

TABLE III
EVALUATION OF DYE-HECTORITE PIGMENT AT 0.5% AND 0.75% LOADINGS IN HIMONT PP 6601

| SAMPLE | FILLER | HUNTER COLOR VALUES L | a | b |
| --- | --- | --- | --- | --- |
| 1 | 0.5% | 23.6 | 7.8 | −12.0 |
| 2 | 0.75% | 23.7 | 3.4 | −4.4 |
| 3 | 0.5% | 23.8 | 2.3 | −3.9 |
| 4 | 0.75% | 23.7 | 0.4 | −0.2 |
| 5 | 0.5% | 23.7 | 3.4 | −2.6 |
| 6 | 0.75% | 23.7 | 1.0 | 0.3 |
| 7 | 0.5% | 37.4 | 39.5 | 20.6 |
| 8 | 0.75% | 34.5 | 35.0 | 18.5 |
| 9 | 0.5% | 58.6 | 1.3 | 57.1 |
| 10 | 0.75% | 53.8 | 2.6 | 49.8 |
| 11 | 0.5% | 23.6 | 0.1 | 1.4 |
| 12 | 0.75% | 23.5 | 0.2 | 1.4 |
| 13 Himont 6601 PP | Control | 79.9 | 0.9 | 2.5 |

TABLE IV
EVALUATION OF DYE-HECTORITE PIGMENT AT 0.5% AND 0.75% LOADINGS IN HIMONT PP 6601

| Sample | Filler | Pigmented Code Numbers |
| --- | --- | --- |
| 1 | 0.5% | Victoria Blue B |
| 2 | 0.75% | Victoria Blue B |
| 3 | 0.5% | Methylene Blue |
| 4 | 0.75% | Methylene Blue |
| 5 | 0.5% | Methyl Violet X |
| 6 | 0.75% | Methyl Violet X |
| 7 | 0.5% | Rhodamine 6G Red |
| 8 | 0.75% | Rhodamine 6G Red |
| 9 | 0.5% | Auramine Yellow |
| 10 | 0.75% | Auramine Yellow |
| 11 | 0.5% | Methyl Violet X (Jet Milled) |
| 12 | 0.75% | Methyl Violet X (Jet Milled) |
| 13 | Control | Neat Resin Himont PP 6601 Control |

EXAMPLE IV

In this evaluation, a dye-hectorite pigment was prepared which contained various dyes including victoria blue, methylene blue, methyl violet, rhodamine red, and Auramine yellow. Samples of these dye-hectorite pigments were incorporated into Himont PP6601 at 0.5 and 0.75 wt % levels. All samples were stabilized with 0.075% of a thioester and 0.1% phenolic Goodrite 3114 These products are shown in Table IV.

The invention has been described herein with reference to certain preferred embodiments. However, as obvious variations thereon will become apparent to those skilled in the art, the invention is not to be considered as limited thereto.

I claim:

1. A paint containing as a coloring agent a coloring pigment which comprises the reaction product of a cationic organic dye and a sheared, sodium exchanged McDermitt, Nevada calcium magnesium hectorite, said hectorite mineral having an average particle size of 0.1 to 0.6 microns, a generally square or plate-like morphology and high cation exchange capacity in the range of 110 to 150 milliequivalents per 100 grams of dry hectorite, and a charge density yielding a greater than 28.5 angstroms D(001) spacing as measured by x-ray diffraction.

2. A paint according to claim 1, wherein the hectorite which is reacted with the organic cationic dye is a calcium-magnesium hectorite which has been converted to the sodium form by reaction with sodium carbonate or a sodium exchange resin.

3. A paint according to claim 1, wherein the organic cationic dye is selected from the group consisting of Victoria blue, Methylene blue, Methyl violet, Rhodamine red and Auramine yellow.

4. A paint according to claim 1, wherein the pigment has been milled prior to incorporation into the paint.

5. A printing ink which contains as a coloring agent a coloring pigment which comprises the reaction product of a cationic organic dye and a sheared, sodium exchanged McDermitt, Nevada calcium magnesium hectorite, said hectorite mineral having an average particle size of 0.1 to 0.6 microns generally square or plate-like morphology, a high cation exchange capacity in the range of 100 to 150 milliequivalents per 100 grams of dry hectorite and a charge density yielding a greater than 28.5 angstroms D(001) spacing as measured by x-ray diffraction.

6. A printing ink according to claim 5, wherein the hectorite which is reacted with the organic cationic dye is a calcium-magnesium hectorite which has been converted to the sodium form by reaction with sodium carbonate or a sodium exchange resin.

7. A printing ink according to claim 5, wherein the organic cationic dye is selected from the group consisting of Victoria blue, Methylene blue, Methyl violet, Rhodamine red and Auramine yellow.

8. A printing ink according to claim 5, wherein the pigment has been milled prior to incorporation into the ink.

9. A paper or paperboard which has been printed with a printing ink which contains a coloring pigment which comprises the reaction product of a cationic organic dye and a sheared, sodium-exchanged McDermitt, Nevada calcium magnesium hectorite, said hectorite mineral having an average particle size of 0.1 to 0.6 microns, a generally square or plate-like morphology, a high cation exchange capacity in the range of 100 to 150 milliequivalents per 100 grams of dry hectorite and a charge density yielding a greater than 28.5 angstroms D(001) spacing as measured by x-ray diffraction.

10. A paper according to claim 9, wherein the hectorite which is reacted with the organic cationic dye is a calcium-magnesium hectorite which has been converted to the sodium form by reaction with sodium carbonate and/or a sodium exchange resin.

11. A paper according to claim 9, wherein the organic cationic dye is selected from the group consisting of Victoria blue, Methylene blue, Methyl violet, Rhodamine red and Auramine yellow.

12. A paper according to claim 9, wherein the pigment has been jet milled prior to incorporation into the ink.

* * * * *